(12) United States Patent
Futatsugi et al.

(10) Patent No.: US 10,686,637 B2
(45) Date of Patent: Jun. 16, 2020

(54) RECEIVING APPARATUS AND RECEIVING METHOD

(71) Applicant: NEC Corporation, Minato-ku, Tokyo (JP)

(72) Inventors: Yasunori Futatsugi, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 162 days.

(21) Appl. No.: 15/550,107

(22) PCT Filed: Feb. 15, 2016

(86) PCT No.: PCT/JP2016/054287
§ 371 (c)(1),
(2) Date: Aug. 10, 2017

(87) PCT Pub. No.: WO2016/133044
PCT Pub. Date: Aug. 25, 2016

(65) Prior Publication Data
US 2018/0013598 A1    Jan. 11, 2018

(30) Foreign Application Priority Data

Feb. 20, 2015 (JP) .................................. 2015-031231

(51) Int. Cl.
*H04L 27/26* (2006.01)
*H04B 17/336* (2015.01)
*H04J 11/00* (2006.01)

(52) U.S. Cl.
CPC ......... *H04L 27/265* (2013.01); *H04B 17/336* (2015.01); *H04J 11/0023* (2013.01); *H04L 27/2665* (2013.01); *H04L 27/2691* (2013.01)

(58) Field of Classification Search
CPC ............... H04L 27/265; H04L 27/2665; H04L 27/2691; H04L 27/2656; H04L 27/2663;
(Continued)

(56) References Cited

U.S. PATENT DOCUMENTS

| | | | | |
|---|---|---|---|---|
| 8,018,975 B2 * | 9/2011 | Ma | ......................... | H04B 7/022 370/509 |
| 2005/0100109 A1 * | 5/2005 | Nagata | ..................... | H04L 5/026 375/260 |

(Continued)

FOREIGN PATENT DOCUMENTS

| | | |
|---|---|---|
| JP | 2004-266814 A | 9/2004 |
| JP | 2005-065197 A | 3/2005 |

(Continued)

OTHER PUBLICATIONS

C. S. Suyama, H. Suzuki, K. Fukawa, "A MIMO-OFDM Receiver Employing the Low-Complexity Turbo Equalization in Multipath Environments with Delay Difference Greater than the Guard Interval," IEICE Trans. Commun., vol. E88-B, No. 1, Jan. 2005, pp. 39-46.

(Continued)

*Primary Examiner* — Un C Cho
*Assistant Examiner* — Rasha K Fayed

(57) ABSTRACT

The present invention improves reception characteristics of a receiving apparatus based on OFDM. The receiving apparatus includes: a window timing selection unit that determines Fourier transform window start and end timings for a received signal(s) based on OFDM, based on a signal-to-interference power ratio and signal power in a Fourier transform window; and a Fourier transform unit that performs Fourier transform on the received signal(s) in accordance with the Fourier transform window start and end timings outputted by the window timing selection unit.

17 Claims, 16 Drawing Sheets

(58) Field of Classification Search
CPC ............ H04L 27/2675; H04L 27/2695; H04L 27/2662; H04L 27/2657; H04L 27/2602; H04L 27/2678; H04L 27/2688; H04L 27/2607; H04L 27/261; H04L 27/28; H04L 27/06; H04L 25/0214; H04L 25/0232; H04L 25/0212; H04L 25/0216; H04L 25/022; H04L 25/0224; H04L 25/03159; H04L 1/0057; H04L 1/0054; H04L 1/0065; H04L 1/0071; H04L 1/10; H04L 5/0046; H04L 5/023; H04L 5/1453; H04L 5/0007; H04L 5/0058; H04L 5/006; H04L 5/026; H04B 17/336

See application file for complete search history.

(56) References Cited

U.S. PATENT DOCUMENTS

| | | | | |
|---|---|---|---|---|
| 2007/0002728 A1* | 1/2007 | Fujii | ............ | H04L 25/0206 370/210 |
| 2007/0030797 A1* | 2/2007 | Baek | ............ | H04L 27/2662 370/208 |
| 2008/0002645 A1* | 1/2008 | Seki | ............ | H04L 25/03834 370/338 |
| 2008/0101488 A1* | 5/2008 | Wilhelmsson | ............ | H04L 1/20 375/260 |
| 2008/0112309 A1* | 5/2008 | Hamaguchi | ............ | H04L 1/06 370/208 |
| 2013/0336288 A1* | 12/2013 | Tu | ............ | H04W 36/0077 370/331 |

FOREIGN PATENT DOCUMENTS

| | | |
|---|---|---|
| JP | 2005-168000 A | 6/2005 |
| JP | 2007-158721 A | 6/2007 |
| JP | 2010-103716 A | 5/2010 |
| JP | 2012-165064 A | 8/2012 |

OTHER PUBLICATIONS

International Search Report for PCT Application No. PCT/JP2016/054287, dated Mar. 29, 2016.

* cited by examiner

Fig. 5

| TECHNIQUES | WINDOW TIMING DETERMINATION RULES | FOURIER TRANSFORM LENGTH |
|---|---|---|
| FIRST EXAMPLE EMBODIMENT | EXAMPLE 1) MAXIMUM SIGNAL POWER UNDER SIR CONSTRAINT<br><br>EXAMPLE 2) MAXIMUM SIR UNDER SIGNAL POWER CONSTRAINT | CHANGED BASED ON RELATIVE POWER AND TIMINGS OF INDIVIDUAL PATHS |
| CONVENTIONAL OFDM RECEPTION | FIRST PATH TIMING | FIXED TRANSMISSION IFFT LENGTH |
| PATENT LITERATURE 1 | MAXIMUM SIR | FIXED TRANSMISSION IFFT LENGTH |
| NON-PATENT LITERATURE 1 | MAXIMUM SIGNAL POWER | DELAY SPREAD + CP LENGTH + TRANSMISSION IFFT LENGTH |

Fig. 9

| RECEIVED SINR | OFFSET $\alpha$ |
|---|---|
| $SINR < A_0$ | $\alpha_0$ |
| $A_0 \leq SINR < A_1$ | $\alpha_1$ |
| $A_1 \leq SINR < A_2$ | $\alpha_2$ |
| $A_2 \leq SINR < A_n$ | $\alpha_n$ |

US 10,686,637 B2

RECEIVING APPARATUS AND RECEIVING METHOD

REFERENCE TO RELATED APPLICATION

This application is a National Stage Entry of PCT/JP2016/054287 filed on Feb. 15, 2016, which claims priority from Japanese Patent Application 2015-031231 filed on Feb. 20, 2015, the contents of all of which are incorporated herein by reference, in their entirety.

TECHNICAL FIELD

The present invention relates to a receiving apparatus and a receiving method. In particular, it relates to an apparatus and a method for receiving signals encoded by using a digital modulation technique as typified by OFDM (Orthogonal Frequency Division Multiplexing).

BACKGROUND ART

In recent years, various wireless communication systems have adopted Orthogonal Frequency Division Multiplexing (OFDM). In this OFDM, since parallel transmission using a plurality of carriers is performed, the length of an individual symbol can be prolonged. Thus, even on a multipath communication channel having frequency selectivity, an individual received signal can be equalized by using a simple receiver configuration. Generally, in OFDM, to cope with a multipath communication channel, a cyclic prefix (CP) is arranged between OFDM symbols. Usually, the length of a CP is designed in view of a delay spread of a multipath communication channel. If the delay spread exceeds the CP length, OFDM Inter Symbol Interference (ISI) is caused in which OFDM symbols arranged before and after a desired symbol in the time direction interfere with the desired symbol, and Inter Carrier Interference (ICI) is caused in which sub-carriers in the frequency direction interfere with each other. When these ISI and ICI are caused, reception characteristics are deteriorated. ISI is caused when an OFDM symbol arranged before or after another OFDM symbol on which the receiver side performs Fast Fourier Transform (FFT) exceeds the CP length and leaks into the target FFT window. ICI is caused between sub-carriers when a delay spread exceeds the CP length and a channel matrix results in a non-circulant matrix and fails to be diagonalized by FFT.

As techniques to solve the above problems, receiving apparatuses disclosed in Patent Literatures (PTLs) 1 and 2 are known. PTLs 1 and 2 disclose examples in which, in an environment where a delay spread could exceed a guard interval (GI) corresponding to the length of a CP, a timing at which the signal-to-interference power ratio (SIR) in an FFT window reaches a maximum level on the receiver side is set as an FFT window start timing.

FIG. 12 is a block diagram illustrating detailed constituent elements relating to FFT window timing determination for describing symbol synchronization timing detection processing performed by the receiving apparatus disclosed in PTL 1. FIG. 12 illustrates a configuration including a window start timing candidate determination unit 1001, an intra-FFT-window signal power calculation unit 1002, an intra-FFT-window interference power calculation unit 1003, an intra-FFT-window SIR calculation unit 1004, and a maximum SIR timing detection unit 1005.

The window start timing candidate determination unit 1001 refers to a delay profile of a communication channel between transmitting and receiving apparatuses and outputs the beginning of an individual OFDM symbol or the end of an individual CP to the intra-FFT-window signal power calculation unit 1002 and the intra-FFT-window interference power calculation unit 1003 as a window start timing candidate. [Translation notes: The term "intra-FFT-window" denotes within a FFT window and not a between FFT windows"]

The intra-FFT-window signal power calculation unit 1002 calculates intra-FFT-window signal power by referring to the delay profile at an individual one of the window start timing candidates and outputs the calculated signal power to the intra-FFT-window SIR calculation unit 1004.

The intra-FFT-window interference power calculation unit 1003 calculates intra-FFT-window interference power by referring to the delay profile at the individual one of the window start timing candidates and outputs the calculated interference power to the intra-FFT-window SIR calculation unit 1004.

The intra-FFT-window SIR calculation unit 1004 calculates intra-FFT-window SIR by referring to the intra-FFT-window signal power and the intra-FFT-window interference power at the individual one of the window start timing candidates and outputs the calculated SIRs to the maximum SIR timing detection unit 1005.

The maximum SIR timing detection unit 1005 selects a window start timing achieving the maximum intra-FFT-window SIR from the window start timing candidates and outputs the selected window start timing.

FIG. 13 is a schematic diagram illustrating a relationship between the delay profile and the FFT window start timing candidates. As illustrated in a) in FIG. 13 [FIG. 13A], in conventional OFDM, the end of a CP of the first path is used as the FFT window start timing. In contrast, as illustrated in b) [FIG. 13B], in PTL 1, the beginning of an individual OFDM symbol and the end of a CP of an individual path are selected as the FFT window start timing candidate(s), and a window start timing is selected from the FFT window start timing candidates. The length of an FFT window is the same as the length of Inverse Fast Fourier Transform (IFFT), which is processing performed on the transmitter side of the OFDM transmission. Thus, a window end timing is determined by adding time period equivalent to the length of the transmission IFFT to the window start timing.

As described above, to improve its reception characteristics, the receiving apparatus disclosed in PTL 1 selects an FFT start window timing that achieves the maximum intra-FFT-window SIR.

As another technique to solve the same problems, a receiving apparatus disclosed in Non-Patent Literature (NPL) 1 is known. NPL 1 discloses an example in which, in an environment where a delay spread could exceed a guard interval corresponding to the CP length, Fourier transform is performed on a received signal between a window start timing and a window end timing that cover all received OFDM symbols that have passed multipaths.

FIG. 14 is a simplified block diagram illustrating a configuration of the receiving apparatus disclosed in NPL 1, the configuration relating to Fourier transform window timing determination. The receiving apparatus disclosed in NPL 1 in FIG. 14 includes a window start timing determination unit 1101 and a window end timing determination unit 1102.

The window start timing determination unit 1101 refers to a delay profile and outputs the first path as a Fourier transform window start timing.

The window end timing determination unit 1102 refers to the delay profile and outputs the end of an OFDM symbol of the last path as a Fourier transform window end timing.

FIG. 15 schematically illustrates Fourier transform window start and end timings in NPL 1. In FIG. 15, a) illustrates an FFT window start timing in conventional OFDM, and b) illustrates Fourier transform window start and end timings in NPL 1. As illustrated in b), according to NPL 1, Fourier transform window start and end timings are determined such that all OFDM symbols that have passed multipaths are covered. In this way, the maximum signal power of desired OFDM symbols can be recovered. According to NPL 1, while the interference component in a Fourier transform window increases as the length of the Fourier transform window extends, an interference canceller aims to remove the interference component from the received signal.

PTL 1: Japanese Patent Kokai Publication No. JP2005-168000A

PTL 2: Japanese Patent Kokai Publication No. JP2010-103716A

NPL 1: S. Suyama, H. Suzuki, K. Fukawa, "A MIMO-OFDM Receiver Employing the Low-Complexity Turbo Equalization in Multipath Environments with Delay Difference Greater than the Guard Interval," IEICE Trans. Commun., vol. E88-B, no. 1, January 2005.

SUMMARY

The following analysis has been made by the present inventors. With the technique disclosed in PTL 1, since an individual FFT window on the receiver side has the same length as the length of the transmission IFFT, the signal power leaking from the FFT window could not be sufficiently recovered. In contrast, with the technique disclosed in NPL 1, since Fourier transform is performed such that all the desired OFDM symbols are covered, the signal power can be maximized. However, since the interference canceller cannot completely remove the interference power, some residual interference power remains, which resulted in that NPL 1 could not achieve sufficient improvement effect in characteristics.

It is an object of the present invention to provide a receiving apparatus and a receiving method that can contribute to improving reception characteristics with respect to received signals based on OFDM.

According to a first aspect, there is provided a receiving apparatus comprising a window timing selection unit that determines Fourier transform window start and end timings for a received signal(s) based on OFDM, based on a signal-to-interference power ratio and signal power in a Fourier transform window. The receiving apparatus also comprises a Fourier transform unit that performs Fourier transform on the received signal(s) in accordance with the Fourier transform window start and end timings outputted by the window timing selection unit.

According to a second aspect, there is provided a receiving method, comprising: window timing selecting of determining Fourier transform window start and end timings for a received signal(s) based on OFDM, based on a signal-to-interference power ratio and signal power in a Fourier transform window; and Fourier transforming of performing Fourier transform on the received signal(s) in accordance with the Fourier transform window start and end timings outputted by the window timing selecting. Further, this method is associated with a certain machine referred to as a receiving apparatus that receives received signals based on OFDM.

The meritorious effects of the present invention are summarized as follows.

The present invention can contribute to improving reception characteristics with respect to received signals based on OFDM. In addition, the present invention can transform the receiving apparatuses described in Background into a receiving apparatus having improved reception characteristics with respect to received signals based on OFDM.

BRIEF DESCRIPTION OF THE DRAWINGS

FIG. 5 schematically illustrates differences between the first example embodiment of the present disclosure and conventional techniques.

FIG. 9 schematically illustrates a setting example of threshold offset values according to the second example embodiment of the present disclosure.

MODES

Figure 1:
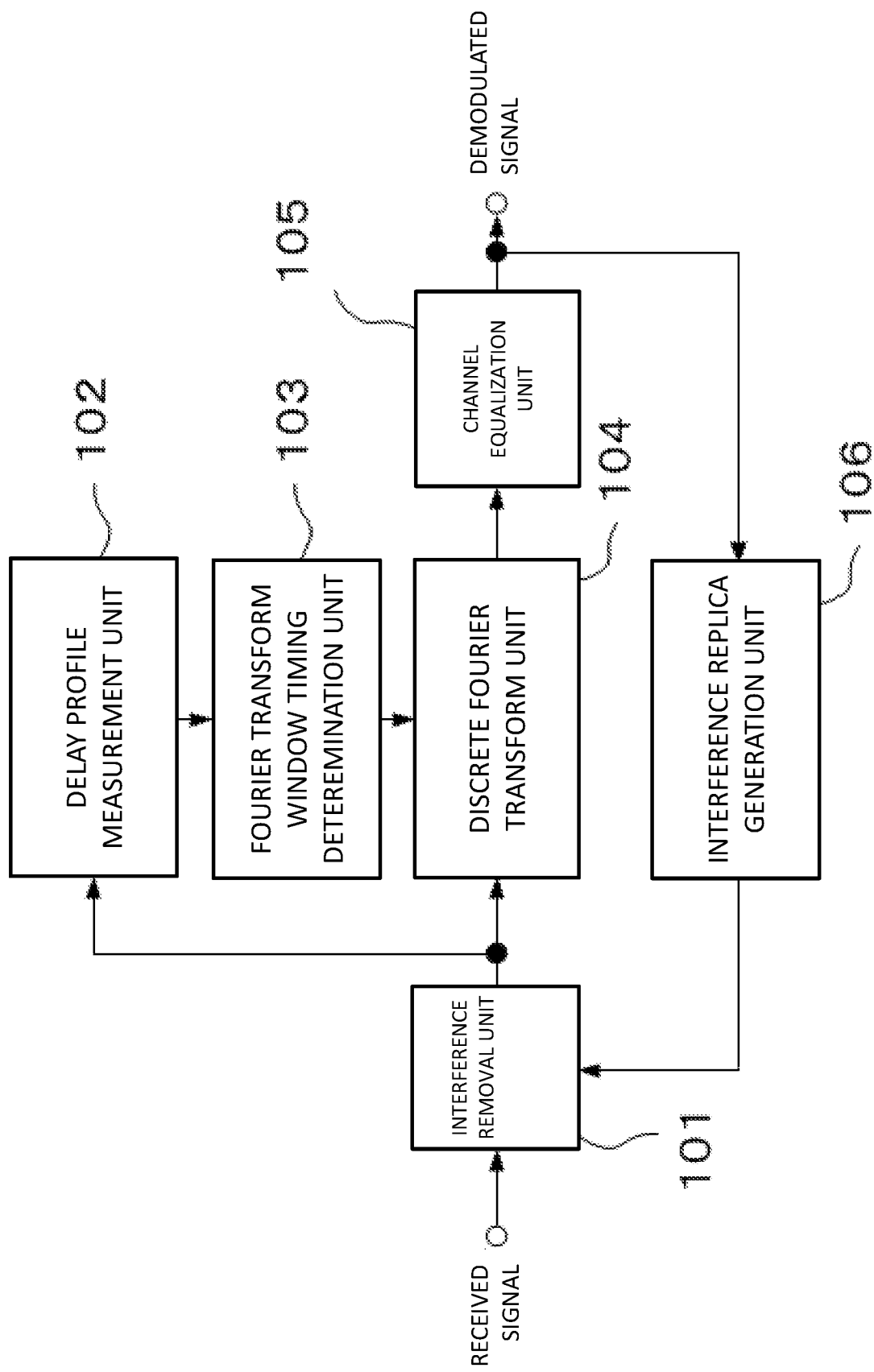
FIG. 1 is a block diagram illustrating a configuration example of a receiving apparatus according to a first example embodiment of the present disclosure.

First, an outline of an example embodiment of the present disclosure will be described with reference to a drawing. In the following outline, various components are denoted by reference characters for the sake of convenience. Namely, the following reference characters are merely used as examples to facilitate understanding of the present disclosure, not to limit the present disclosure to the illustrated modes.

Figure 16:
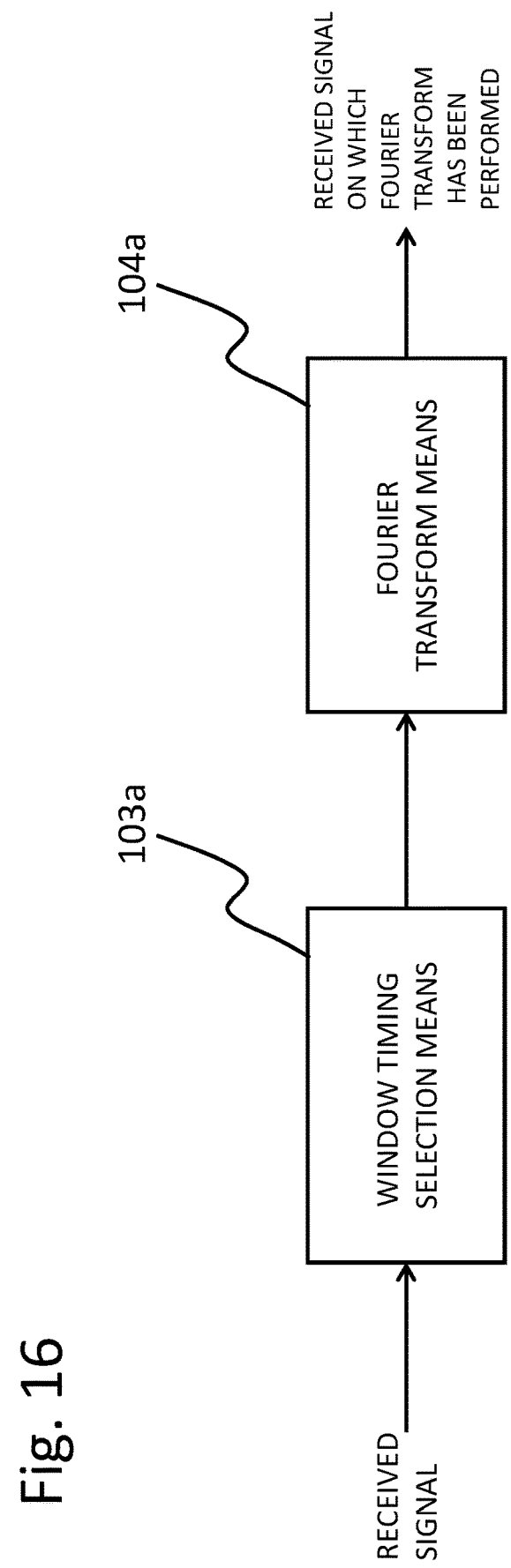
FIG. 16 illustrates a configuration according to an example embodiment of the present disclosure.

As illustrated in FIG. 16, an example embodiment of the present disclosure can be realized by a receiving apparatus including window timing selection means 103a and Fourier transform means 104a.

More specifically, the window timing selection means 103a determines Fourier transform window start and end timings for a received signal based on OFDM, based on a signal-to-interference power ratio (SIR) and signal power in a Fourier transform window. Next, the Fourier transform means 104a performs Fourier transform on the received signal in accordance with the Fourier transform start and end timings determined by the window timing selection means.

As described above, the receiving apparatus according to the present example embodiment determines Fourier transform start and end timings based on a signal-to-interference power ratio and signal power in a Fourier transform window. Thus, compared with the receiving apparatus in PTL 1, the receiving apparatus according to the present example embodiment can recover more of the signal power leaking from the Fourier transform window. In addition, the above method can reduce the impact caused by the residual interference power that cannot be removed by an interference canceller. Consequently, the above method can achieve improved reception characteristics as compared to those achieved by the methods in PTL 1 and NPL 1.

First Example Embodiment

FIG. 1 illustrates a configuration of a receiving apparatus according to a first example embodiment of the present disclosure. In an environment where a delay spread of a multipath communication channel exceeds the length of a CP, the receiving apparatus according to the first example embodiment of the present disclosure determines Fourier transform window start and end timings and performs demodulation so as to increase the signal power and reducing the influence caused by the residual interference power that cannot be removed by an interference canceller. The first example embodiment will be described based on an example in which OFDM is used as the transmission technique. The first example embodiment illustrated in FIG. 1 includes, for configuration, an interference removal unit 101, a delay profile measurement unit 102, a Fourier transform window timing determination unit 103, a discrete Fourier transform unit 104, a channel equalization unit 105, and an interference replica generation unit 106.

The interference removal unit 101 receives a received signal, which has been transmitted from a transmitting apparatus and passed through a communication channel formed by one or more paths, and receives an interference replica from the interference replica generation unit 106. The interference removal unit 101 removes the interference component from the received signal based on the interference replica and outputs the received signal to the delay profile measurement unit 102 and the discrete Fourier transform unit 104. When the first equalization is performed, a value as the interference replica may be set to zero.

The delay profile measurement unit 102 receives the received signal whose interference component has been removed from the interference removal unit 101 and measures a delay profile of the communication channel between the transmitting and receiving apparatuses. For example, the delay profile can be obtained by performing FFT processing on the received signal whose interference component has been removed, performing correlation processing between the FFT-processed received signal and a reference signal replica, and performing IFFT processing on the resultant received signal. The delay profile measurement unit 102 outputs the measured delay profile to the Fourier transform window timing determination unit 103.

The Fourier transform window timing determination unit 103 receives the delay profile from the delay profile measurement unit 102. The Fourier transform window timing determination unit 103 refers to the delay profile, determines Fourier transform window start and end timings, and outputs the Fourier transform window start and end timings to the discrete Fourier transform unit 104.

The discrete Fourier transform unit 104 receives the Fourier transform window start and end timings from the Fourier transform window timing determination unit 103 and receives the received signal whose interference component has been removed from the interference removal unit 101. The discrete Fourier transform unit 104 performs discrete Fourier transform processing on the received signal whose interference component has been removed in accordance with the received Fourier transform window start and end timings and outputs the received signal to the channel equalization unit 105. For example, DFT (Discrete Fourier Transform) in which the integration range has an arbitrary length in the time direction may be used in Fourier transform processing performed by the discrete Fourier transform unit 104.

The channel equalization unit 105 receives the received signal on which the Fourier transform has been performed from the discrete Fourier transform unit 104. The channel equalization unit 105 performs channel equalization processing on the received signal to compensate for fading on the communication channel and outputs a demodulated signal to the interference replica generation unit 106. Further, the channel equalization unit 105 may include error correction decoding processing.

The interference replica generation unit 106 receives the demodulated signal from the channel equalization unit 105. The interference replica generation unit 106 generates an interference replica based on the demodulated signal and outputs the interference replica to the interference removal unit 101. The interference replica may be an ISI replica and/or an ICI replica.

Figure 2:
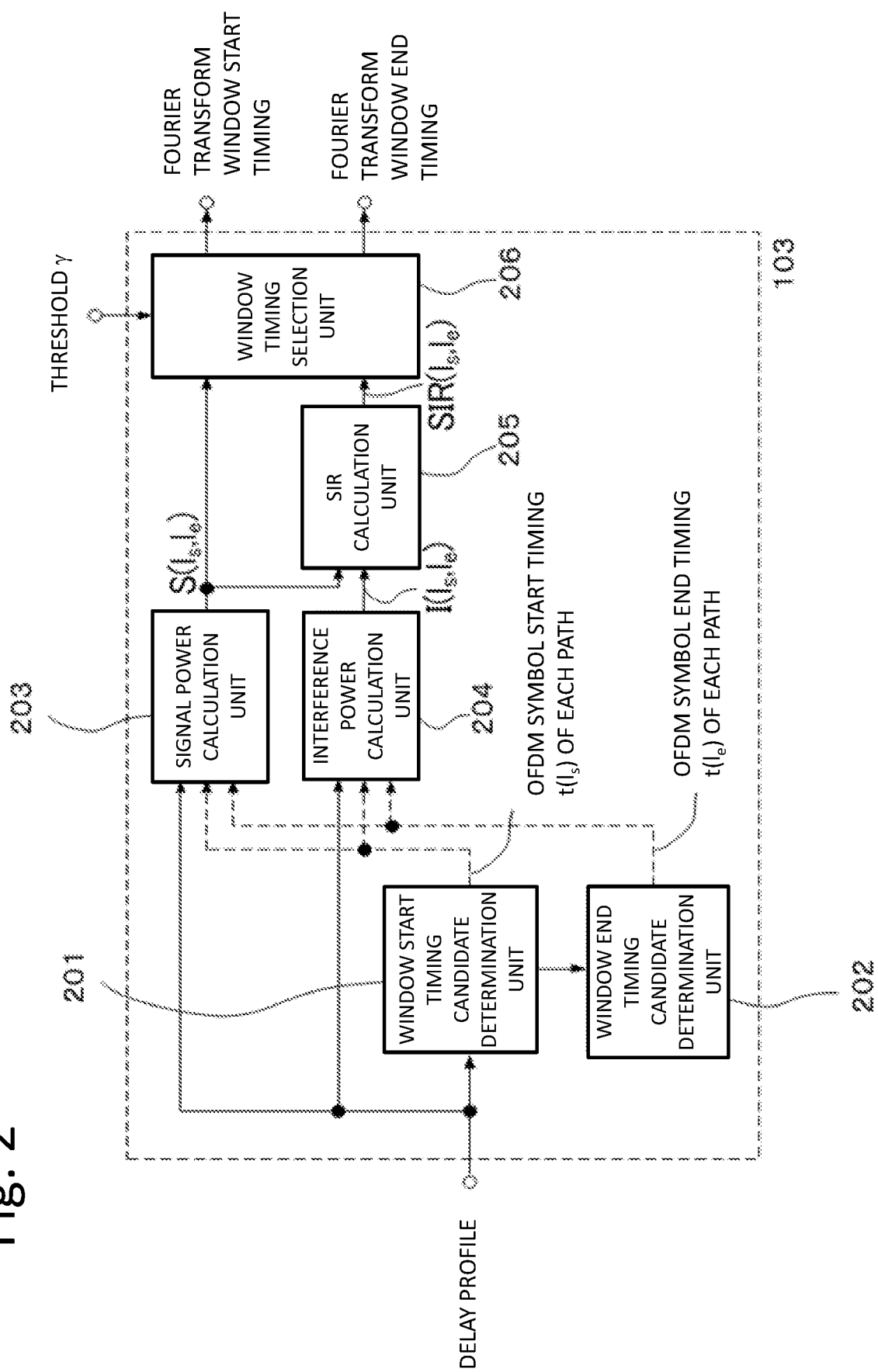
FIG. 2 is a block diagram illustrating a configuration example of a Fourier transform window timing determination unit illustrated in FIG. 1.

FIG. 2 illustrates a detailed configuration of the Fourier transform window timing determination unit 103 in FIG. 1. The Fourier transform window timing determination unit 103 includes, for configuration, a window start timing candidate determination unit 201, a window end timing candidate determination unit 202, a signal power calculation unit 203, an interference power calculation unit 204, an SIR calculation unit 205, and a window timing selection unit 206.

The window start timing candidate determination unit 201 receives the delay profile from the delay profile measurement unit 102. For example, the window start timing candidate determination unit 201 outputs timings whose respective window start timing numbers $l_s$ are 0, 1, 2, ..., L−1 (L is the number of paths of the communication channel and is an integer of 1 or more) to the signal power calculation unit 203 and the interference power calculation unit 204 as window start timing candidates $t(l_s)$.

The window end timing candidate determination unit 202 receives the start timings of individual paths from the window start timing candidate determination unit 201. For example, the window end timing candidate determination unit 202 outputs the end timings of OFDM symbols whose respective window end timing numbers $l_e$ are 0, 1, 2, ..., L−1 to the signal power calculation unit 203 and the interference power calculation unit 204 as window end timing candidates $t(l_e)$. Here, the end of an OFDM symbol on an individual path can be obtained by adding the length of a CP and the length of transmission IFFT to the individual path timing. Since the Fourier transform window timing determination unit 103 narrows down the window start and end timing candidates, the Fourier transform window timing determination unit 103 has a reduced amount of calculation needed for determining the window timing, compared with a case in which all samples are used as timing candidates.

The signal power calculation unit 203 receives a delay profile from the delay profile measurement unit 102, the window start timing candidates $t(l_s)$ from the window start timing candidate determination unit 201, and the window end timing candidates $t(l_e)$ from the window end timing candidate determination unit 202. The signal power calculation unit 203 calculates signal power $S(l_s, l_e)$ in a period between an individual pair of window start and end timing candidates and outputs the signal power $S(l_s, l_e)$ to the SIR calculation unit 205 and the window timing selection unit 206. Here, for example, the signal power can be obtained from a product of convolutional multiplication of an individual path and OFDM symbol replica.

The interference power calculation unit 204 receives the delay profile from the delay profile measurement unit 102, the window start timing candidates $t(l_s)$ from the window start timing candidate determination unit 201, and the window end timing candidates $t(l_e)$ from the window end timing candidate determination unit 202. The interference power calculation unit 204 calculates interference power $I(l_s, l_e)$ in a period between an individual pair of window start and end timing candidates and outputs the interference power $I(l_s, l_e)$ to the SIR calculation unit 205 and the window timing selection unit 206. For example, the interference power can be obtained based on a difference between a maximum value of signal power per sample and signal power per sample. Also, the interference power may be calculated by receiving signal power per sample from the signal power calculation unit 203, instead of the delay profile.

The SIR calculation unit 205 receives the signal power $S(l_s, l_e)$ calculated per pair of window start and end timing candidates from the signal power calculation unit 203 and the interference power $I(l_s, l_e)$ calculated per pair of window start and end timing candidates from the interference power calculation unit 204. The SIR calculation unit 205 calculates a signal-to-interference power ratio $SIR(l_s, l_e)$ per pair of window start and end timing candidates and outputs the calculated signal-to-interference power ratio $SIR(l_s, l_e)$ to the window timing selection unit 206.

The window timing selection unit 206 receives the signal power $S(l_s, l_e)$ calculated per pair of window start and end timing candidates from the signal power calculation unit 203 and the signal-to-interference power ratio $SIR(l_s, l_e)$ calculated per pair of window start and end timing candidates from the SIR calculation unit 205 and compares each of the SIRs $(l_s, l_e)$ with a predetermined threshold γ. Of all the pairs of window start and end timing candidates at which the signal-to-interference power ratio $SIR(l_s, l_e)$ is larger than the threshold γ, the window timing selection unit 206 selects and outputs a pair of candidates achieving the maximum signal power $S(l_s, l_e)$ to the discrete Fourier transform unit 104 as the window start and end timings. Assuming that the signal power and the signal-to-interference power ratio based on the window start timing candidate $t(l_s)$ and the window end timing candidate $t(l_e)$ are $S(l_s, l_e)$ and $SIR(l_s, l_e)$, respectively, when the threshold is λ, the window start timing number $l_s$ and the window end timing number $l_e$ selected are expressed by expression (1).

[Expression 1]

$$\operatorname*{argmax}_{l_s, l_e} S(l_s, l_e)_{\text{subject to}} SIR(l_s, l_e) > \lambda \qquad (1)$$

In addition, of all the pairs of window start and end timing candidates at which the signal power is larger than the predetermined threshold γ, the window timing selection unit 206 may select and output a pair of candidates achieving the maximum signal-to-interference power ratio $SIR(l_s, l_e)$ to the discrete Fourier transform unit 104 as the window start and end timings. The window start timing number $l_s$ and the window end timing number $l_e$ selected are expressed by expression (2).

[Expression 2]

$$\operatorname*{argmax}_{l_s, l_e} SIR(l_s, l_e)_{\text{subject to}} S(l_s, l_e) > \lambda \qquad (2)$$

Since the signal power $S(l_s, l_e)$ is not a relative value but an absolute value, the signal power $S(l_s, l_e)$ greatly fluctuates depending on the reception environment. Thus, the threshold γ in expression (2) may be determined with reference to signal power $S(0, L-1)$ based on the window start and end timings that cover all the desired OFDM symbols that have passed through the multipath channel. In addition, to exclude the window start and end timing candidates at which the Fourier transform window length is shorter than the OFDM symbol length from the candidates selected, a constraint to limit the window length to a length equal to or larger than a sum of the length of transmission IFFT ($L_{IFFT}$) and the length of a CP ($L_{CP}$) may be added. The window start timing number $l_s$ and the window end timing number $l_e$, taking the ratio of signal power that includes signal power based on all the desired OFDM symbols and the constraint on the OFDM symbol length into account, are expressed by expression (3).

[Expression 3]

$$\operatorname*{argmax}_{l_s, l_e} SIR(l_s, l_e)_{\text{subject to}} \begin{cases} \dfrac{S(l_s, l_e)}{S(0, L-1)} > \lambda \\ t(l_e) - t(l_s) \geq L_{IFFT} + L_{CP} \end{cases} \qquad (3)$$

In addition, the constraint on the Fourier transform window length based on the OFDM symbol length may be applied to expression (1), as in expression (3).

Figure 3:
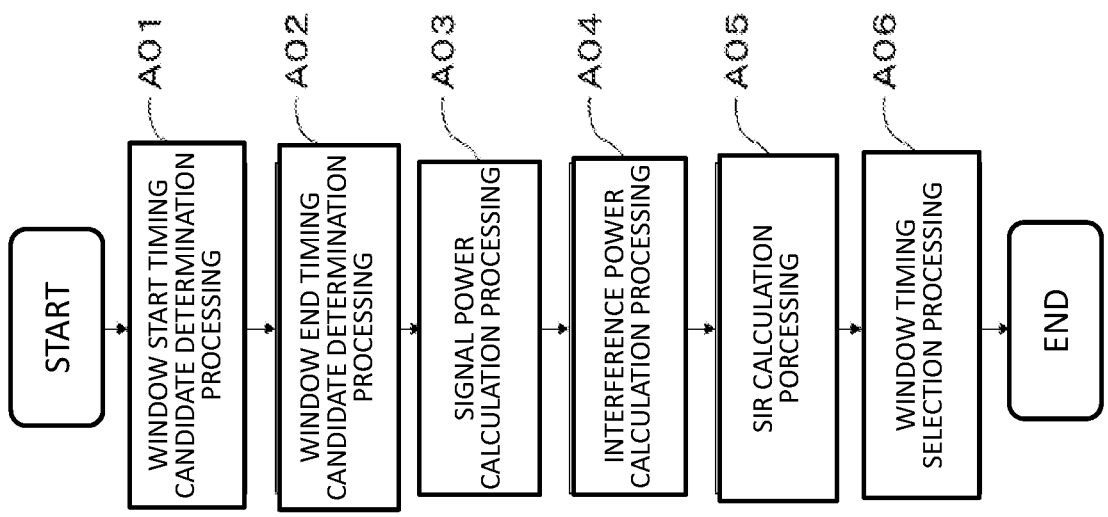
FIG. 3 is a flowchart illustrating an example of processing performed by the Fourier transform window timing determination unit according to the first example embodiment of the present disclosure.

FIG. 3 is a flowchart illustrating an operation example of the Fourier transform window timing determination unit 103 illustrated in FIG. 2. The flowchart in FIG. 3 includes steps A01 to A06.

First, the window start timing candidate determination unit 201 refers to a delay profile and determines window start timing candidates (step A01).

Next, the window end timing candidate determination unit 202 refers to the delay profile and determines window end timing candidates (step A02).

The signal power calculation unit 203 calculates signal power per pair of window start and end timing candidates (step A03).

The interference power calculation unit 204 calculates interference power per pair of window start and end timing candidates (step A04).

Next, the SIR calculation unit 205 calculates a signal-to-interference power ratio per pair of window start and end timing candidates (step A05).

Next, of all the pairs of window start and end timing candidates at which the signal-to-interference power ratio in the Fourier transform window is larger than a threshold $\gamma$, the window timing selection unit 206 selects a pair of candidates achieving the maximum signal power as the window start and end timings. Alternatively, of all the pairs of window start and end timing candidates at which the signal power in the Fourier transform window is larger than the threshold $\gamma$, the window timing selection unit 206 may select a pair of candidates achieving the maximum signal-to-interference power ratio as the window start and end timings (step A06).

Figure 4:
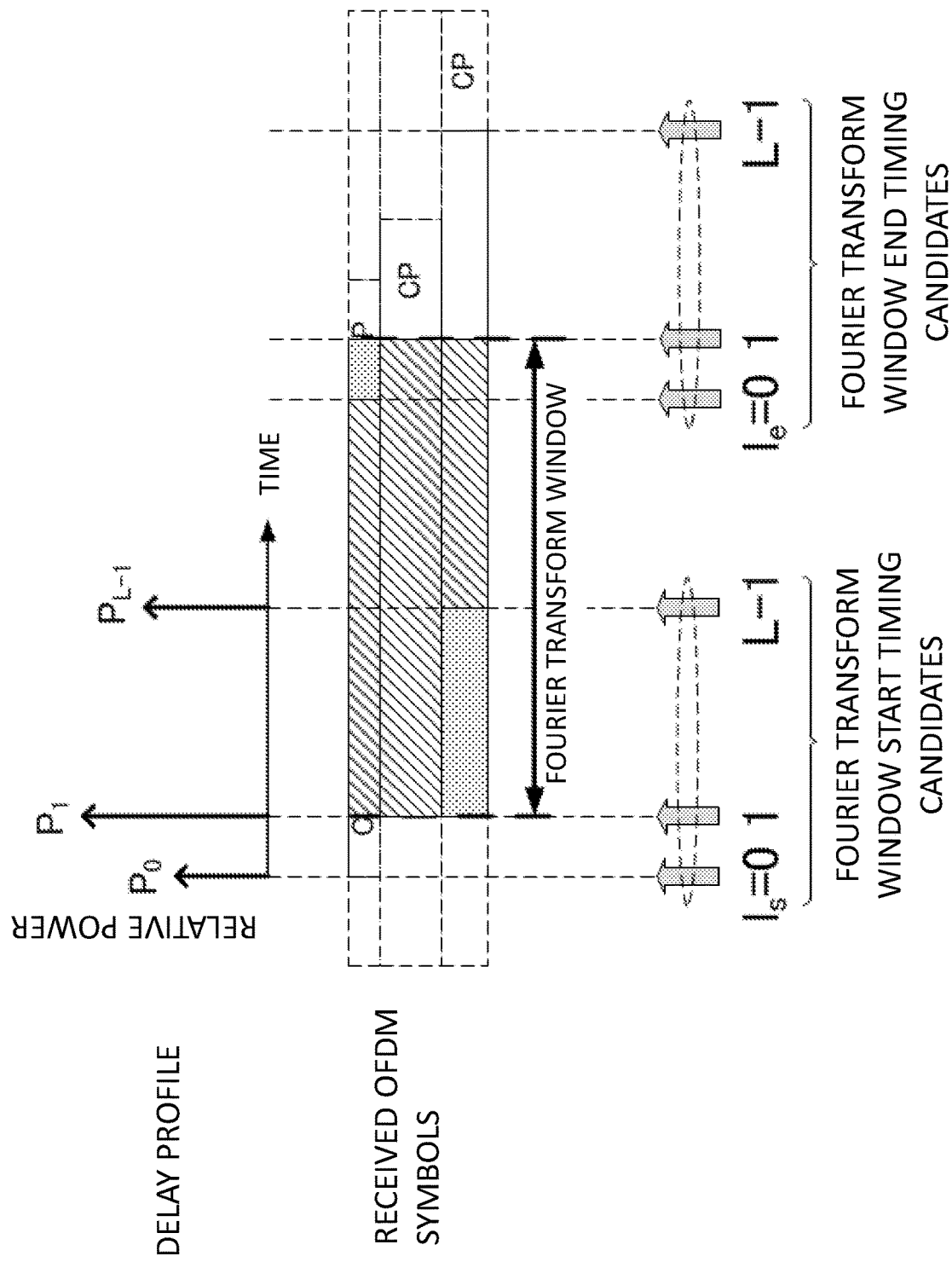
FIG. 4 schematically illustrates Fourier transform window start and end timing candidates according to the first example embodiment of the present disclosure.

FIG. 4 schematically illustrates Fourier transform window start and end timing candidates according to the first example embodiment. FIG. 4 illustrates an example in which the window start timing number $l_s=1$ is selected from L Fourier transform window start timing candidates corresponding to the relevant path timings, and the window end timing number $l_e=1$ is selected from L Fourier transform window end timing candidates corresponding to the OFDM symbol end timings of the relevant paths. In the first example embodiment, window start and end timings are determined from the square numbers of L window start and end timing candidates.

FIG. 5 illustrates differences in window timing determination rule and Fourier transform length among the first example embodiment, a conventional OFDM reception, PTL 1, and NPL 1. According to the conventional OFDM reception, the window timings are determined based on the first path timing. According to PTL 1, the window timings are determined based on the maximum SIR. According to NPL 1, the window timings are determined based on the maximum signal power. However, according to the first example embodiment, the window timings are determined based on the maximum signal power under the SIR constraint (Example 1) or based on the maximum SIR under the signal power constraint (Example 2). In addition, according to the conventional OFDM reception and PTL 1, the Fourier transform length is determined based on a fixed transmission IFFT length. According to NPL 1, the Fourier transform length is determined based on a sum of a delay spread, the CP length, and the transmission IFFT length. However, according to the first example embodiment, the Fourier transform length is determined based on the relative power and timings of individual paths.

Figure 6:
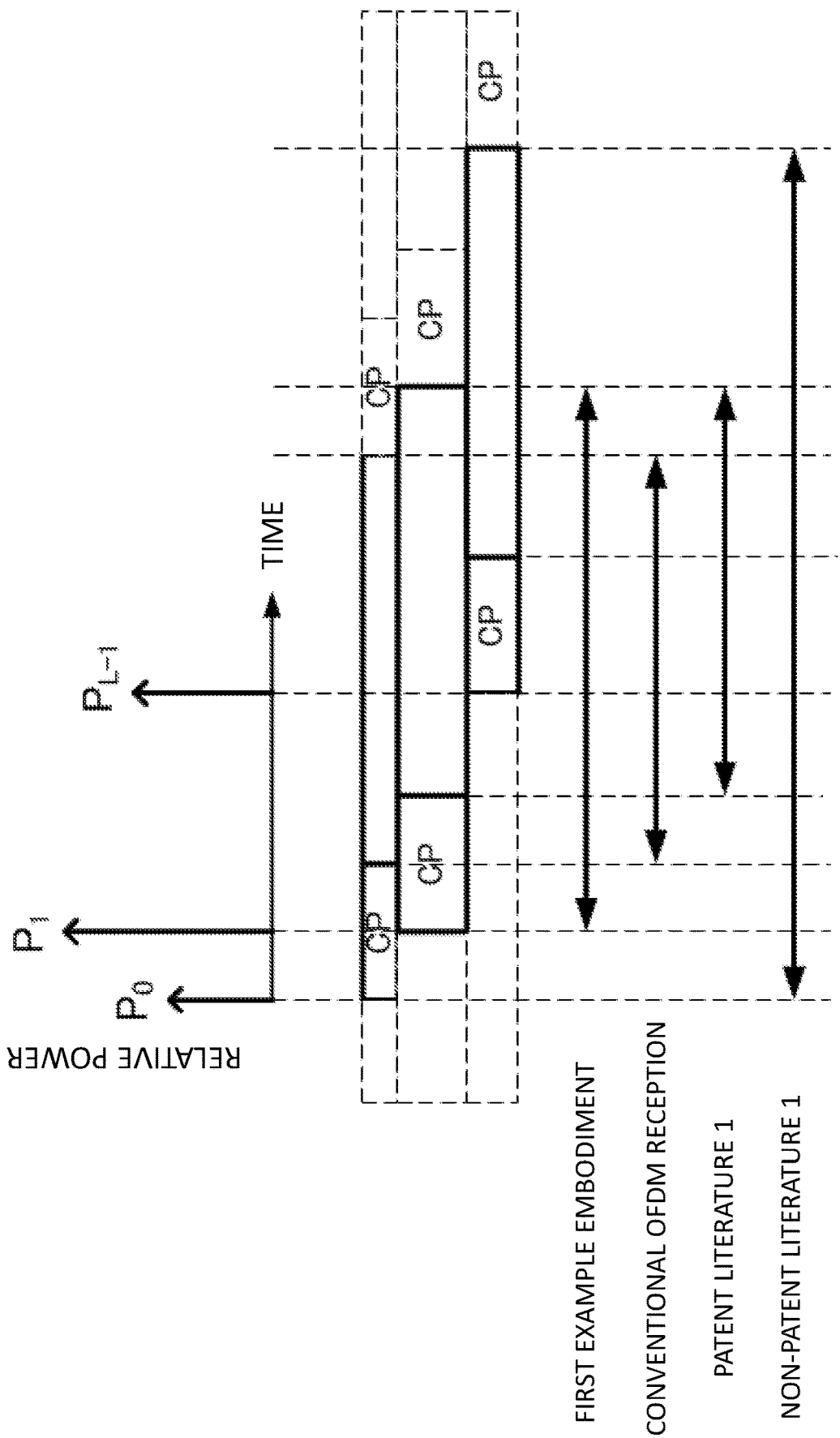
FIG. 6 schematically illustrates an example of a Fourier transform window start and end timing determination result according to the first example embodiment of the present disclosure.

FIG. 6 schematically illustrates window timing determination results obtained according to the first example embodiment, the conventional OFDM reception, PTL 1, and NPL 1 when the relative power in a delay profile has a relationship $P_1 > P_{L-1} > P_0$. According to the conventional OFDM reception, the window start timing is at the end of a CP of a $P_0$ path, which is the first path, and the window end timing is at the end of an OFDM symbol of the $P_0$ path. According to PTL 1, the window start timing is at the end of a CP of a $P_1$ path, and the window end timing is at the end of an OFDM symbol of the $P_1$ path. According to NPL 1, the window start timing is at the beginning of the $P_0$ path, and the window end timing is at the end of an OFDM symbol of a $P_{L-1}$ path. In contrast, according to an example of the first example embodiment, the window start timing is at the beginning of the $P_1$ path, and the window end timing is at the end of the OFDM symbol of the $P_1$ path.

As described above, according to the first example embodiment, in the environment where a delay spread of a communication channel exceeds the length of a CP, there is provided a receiving apparatus that can suppress the influence of residual interference power that cannot be removed by an interference canceller and increase the signal power recovered. Thus, the reception characteristics can be improved.

Second Example Embodiment

Figure 7:
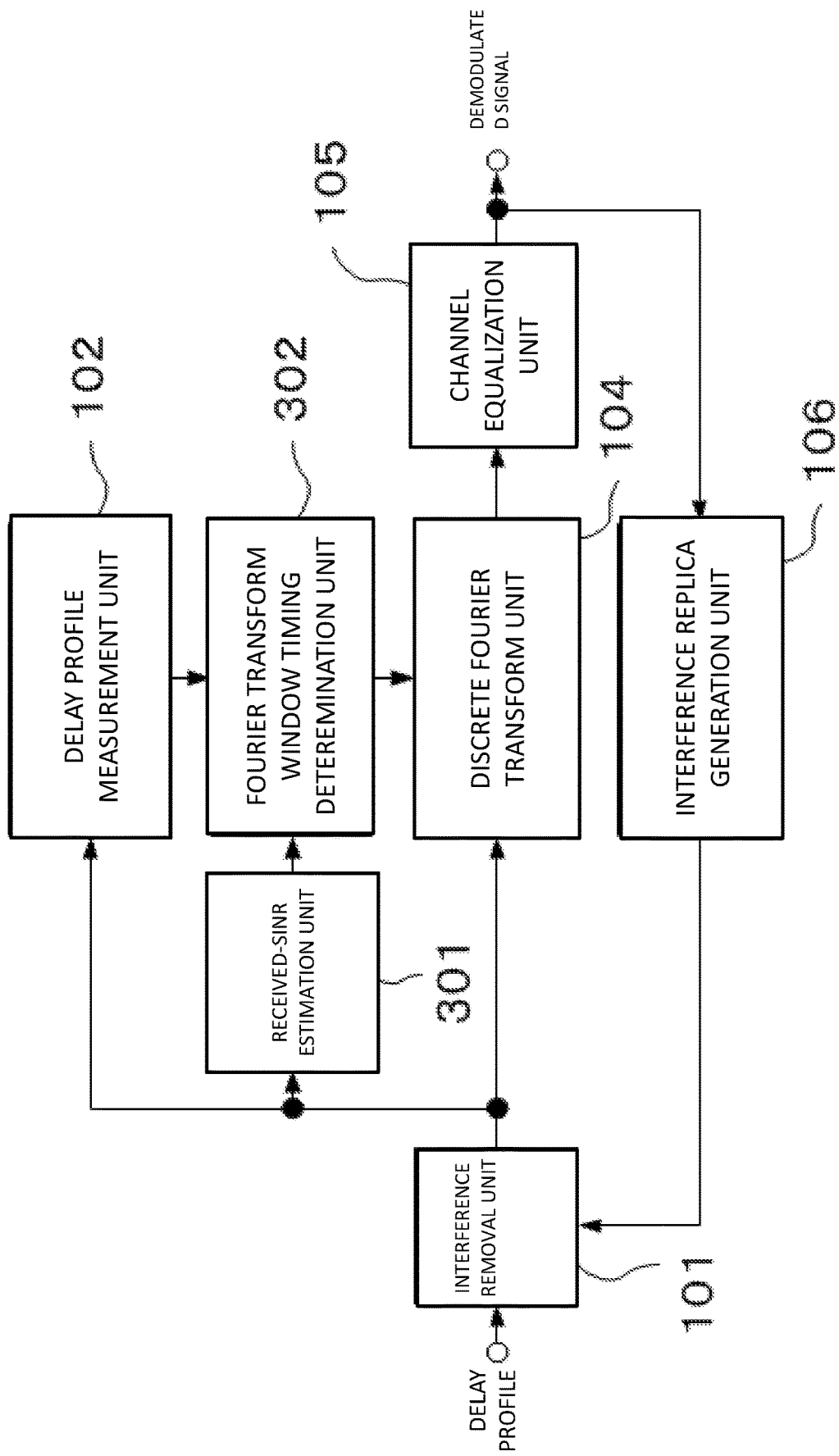
FIG. 7 is a block diagram illustrating a configuration example of a receiving apparatus according to a second example embodiment of the present disclosure.

Next, a second example embodiment of the present disclosure will be described. The second example embodiment is a variation of the first example embodiment. In the second example embodiment, the threshold $\gamma$ is changed depending on the signal-to-interference-plus-noise-power-ratio (SINR) of a received packet. FIG. 7 illustrates a configuration of a receiving apparatus according to the second example embodiment. The first example embodiment differs from the second example embodiment in that a received-SINR estimation unit 301 is added and a Fourier transform window timing determination unit 302 receives input from the received-SINR estimation unit 301. Other elements are the same as those according to the first example embodiment. Hereinafter, the differences between the first and second example embodiments will be described.

The received-SINR estimation unit 301 receives a received signal whose interference has been removed from the interference removal unit 101. The received-SINR estimation unit 301 estimates the received SINR of the received signal and outputs the estimated received SINR to the Fourier transform window timing determination unit 302. For example, the received SINR can be estimated from the error between a reference signal obtained after equalization weight multiplication has been performed and a reference signal replica.

The Fourier transform window timing determination unit 302 receives the estimated received SINR from the received-SINR estimation unit 301 and receives a delay profile from the delay profile measurement unit 102. On the basis of the estimated received SINR and the delay profile, the Fourier transform window timing determination unit 302 determines and outputs Fourier transform window timings to the discrete Fourier transform unit 104.

Figure 8:
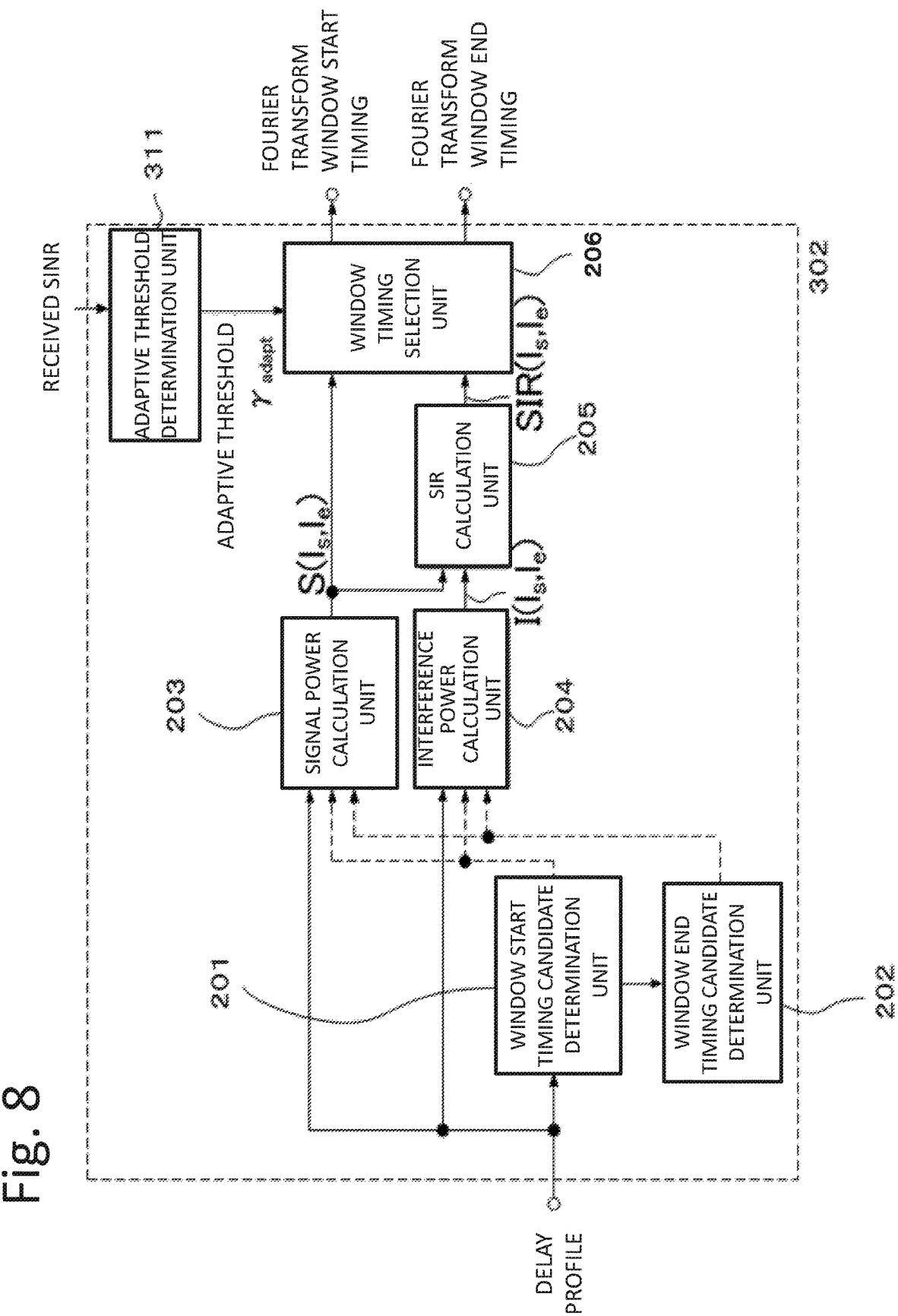
FIG. 8 is a block diagram illustrating a configuration example of a Fourier transform window timing determination unit illustrated in FIG. 7.

FIG. 8 illustrates a detailed configuration of the Fourier transform window timing determination unit 302 (see FIG. 7) according to the second example embodiment. The Fourier transform window timing determination unit 302 according to the second example embodiment is a variation of the Fourier transform window timing determination unit 103 according to the first example embodiment. The Fourier transform window timing determination unit 302 includes an adaptive threshold determination unit 311, in addition to the constituent elements of the Fourier transform window timing determination unit 103 according to the first example embodiment. Hereinafter, the differences between the Fourier transform window timing determination units 103 and 302 according to the respective first and second example embodiments will be described.

The adaptive threshold determination unit 311 receives the estimated received SINR from the received-SINR estimation unit 301. The adaptive threshold determination unit 311 determines an adaptive threshold $\gamma_{adapt}$ on the basis of the estimated received SINR and outputs the determined adaptive threshold $\gamma_{adapt}$ to the window timing selection unit 206. The adaptive threshold $\gamma_{adapt}$ is expressed by expression (4) in which a represents an offset of the threshold $\gamma$.

[Expression 4]

$$\gamma_{adapt} = \gamma + \alpha \qquad (4)$$

The window timing selection unit 206 receives the adaptive threshold $\gamma_{adapt}$ from the adaptive threshold determination unit 311, the signal power per pair of window start and end timing candidates from the signal power calculation unit 203, and the signal-to-interference power ratio per pair of window start and end timing candidates from the SIR calculation unit 205. Among all the pairs of window start and end timing candidates at which the signal-to-interference power ratio is larger than the threshold $\gamma_{adapt}$, the window timing selection unit 206 selects and outputs a pair of candidates achieving the maximum signal power as the Fourier transform window start and end timings. Alternatively, among all the pairs of window start and end timing candidates at which the signal power is larger than the threshold $\gamma_{adapt}$, the window timing selection unit 206 may select and output a pair of candidates achieving the maximum signal-to-interference power ratio as the Fourier transform window start and end timings.

FIG. 9 illustrates an example of a table for determining the offset a, assuming that $A_0$, $A_1$, $A_2$, and $A_n$ are predetermined received-SINR boundary determination values and that a relationship of $A_0 < A_1 < A_2 < A_n$ is established. Assuming that $\alpha_0$, $\alpha_1$, $\alpha_2$, and $\alpha_n$ are offset setting values in the determination table, when the window timings are selected based on the maximum signal power under the SIR constraint, values satisfying $\alpha_0 < \alpha_1 < \alpha_2 < \alpha_n$ are set. In this way, when a packet having a smaller received SINR is received, a smaller value among possible values is set as the adaptive threshold $\gamma_{adapt}$. Thus, the SIR constraint in the window timing determination is eased. On the other hand, when a packet having a larger received SINR is received, a larger value among possible values is set as the adaptive threshold $\gamma_{adapt}$. Thus, the SIR constraint in the window timing determination is tightened.

In contrast, when the window timings are selected based on the maximum SIR under the signal power constraint, values satisfying $\alpha_0 > \alpha_1 > \alpha_2 > \alpha_n$ are set. In this way, when a packet having a smaller received SINR is received, a larger value among possible values is set as the adaptive threshold $\gamma_{adapt}$. Thus, the signal power constraint in the window timing determination is tightened. On the other hand, when a packet having a larger received SINR is received, a smaller value among possible values is set as the adaptive threshold $\gamma_{adapt}$. Thus, the signal power constraint in the window timing determination is eased.

As described above, according to the second example embodiment, when the window timings are selected based on the maximum signal power under the SIR constraint, if a packet having a lower SINR is received, the SIR constraint is eased so that the recovery of the signal power is prioritized. If a packet having a higher SINR is received, the SIR constraint is tightened so that the suppression of the residual interference is prioritized. As a result, the reception characteristics can be improved. On the other hand, when the window timings are selected based on the maximum SIR under the signal power constraint, if a packet having a lower SINR is received, the signal power constraint is tightened so that the recovery of the signal power is prioritized. If a packet having a higher SINR is received, the signal power constraint is eased so that the suppression of the residual interference is prioritized. As a result, the reception characteristics can be improved.

Third Example Embodiment

Figure 10:
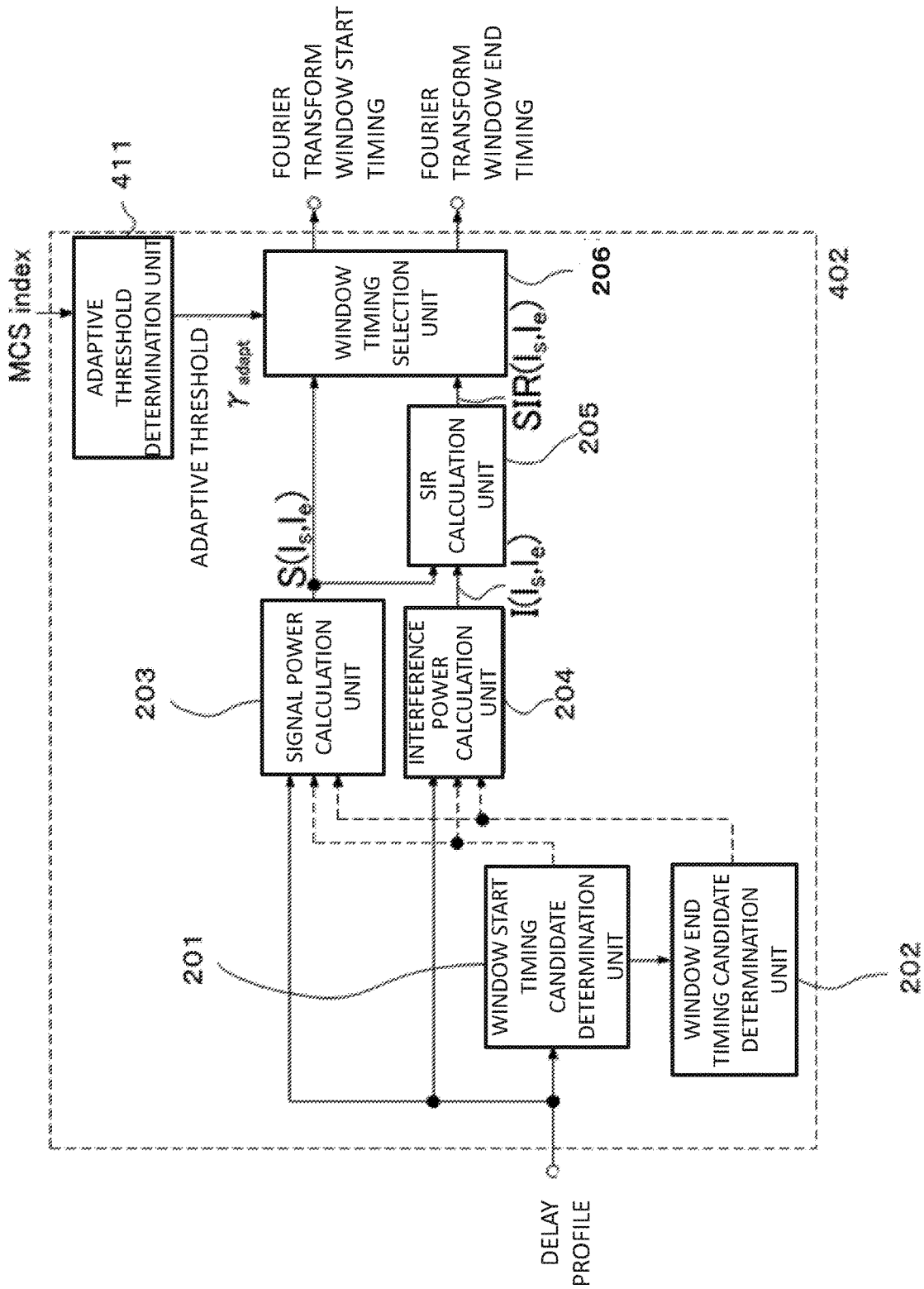
FIG. 10 is a block diagram illustrating a configuration example of a Fourier transform window timing determination unit according to a third example embodiment of the present disclosure.

Next, a third example embodiment of the present disclosure will be described. The third example embodiment is a variation of the second example embodiment. In the third example embodiment, the threshold $\gamma$ is changed depending on a Modulation and Coding Scheme index (MCS index) of a received packet. FIG. 10 illustrates a configuration of a Fourier transform window timing determination unit 402 according to the third example embodiment. The Fourier transform window timing determination unit 402 according to the third example embodiment is a variation of the Fourier transform window timing determination unit 302 according to the second example embodiment. The Fourier transform window timing determination unit 402 refers to an MSC index, instead of a received SINR, as information inputted to an adaptive threshold determination unit 411. Hereinafter, the differences between the adaptive threshold determination units 311 and 411 according to the respective second and third example embodiments will be described.

The adaptive threshold determination unit 411 receives an MCS index. For example, the MCS index is supplied along with a received packet via a radio resource scheduler in the receiving apparatus or a control channel. The adaptive threshold determination unit 411 determines an adaptive threshold $\gamma_{adapt}$ on the basis of the MSC index and outputs the determined adaptive threshold $\gamma_{adapt}$ to the window timing selection unit 206. As in the second example embodiment, the adaptive threshold $\gamma_{adapt}$ is expressed by the expression (4).

Figure 11:
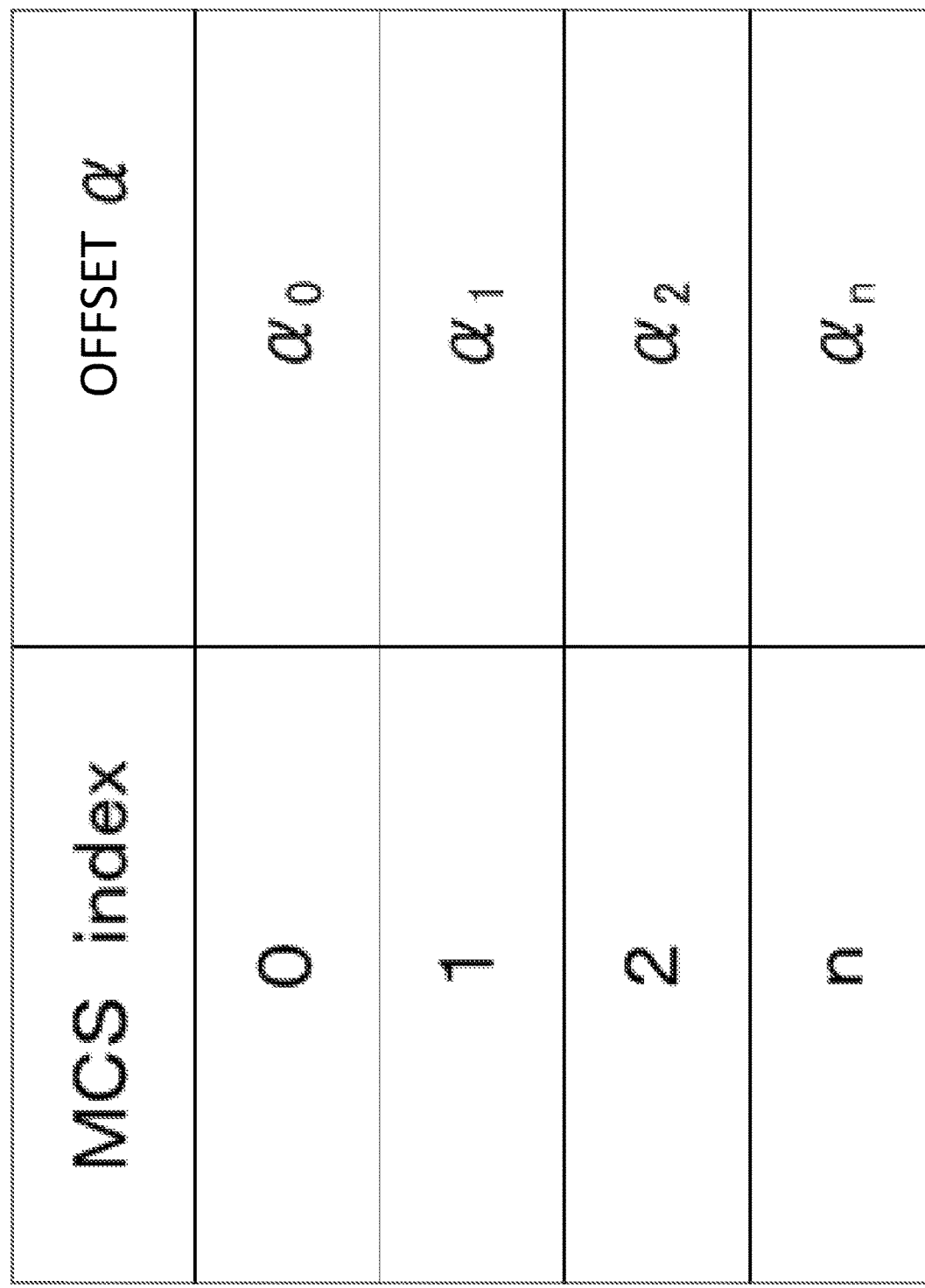
FIG. 11 schematically illustrates a setting example of threshold offset values according to the third example embodiment of the present disclosure.
Figure 12:
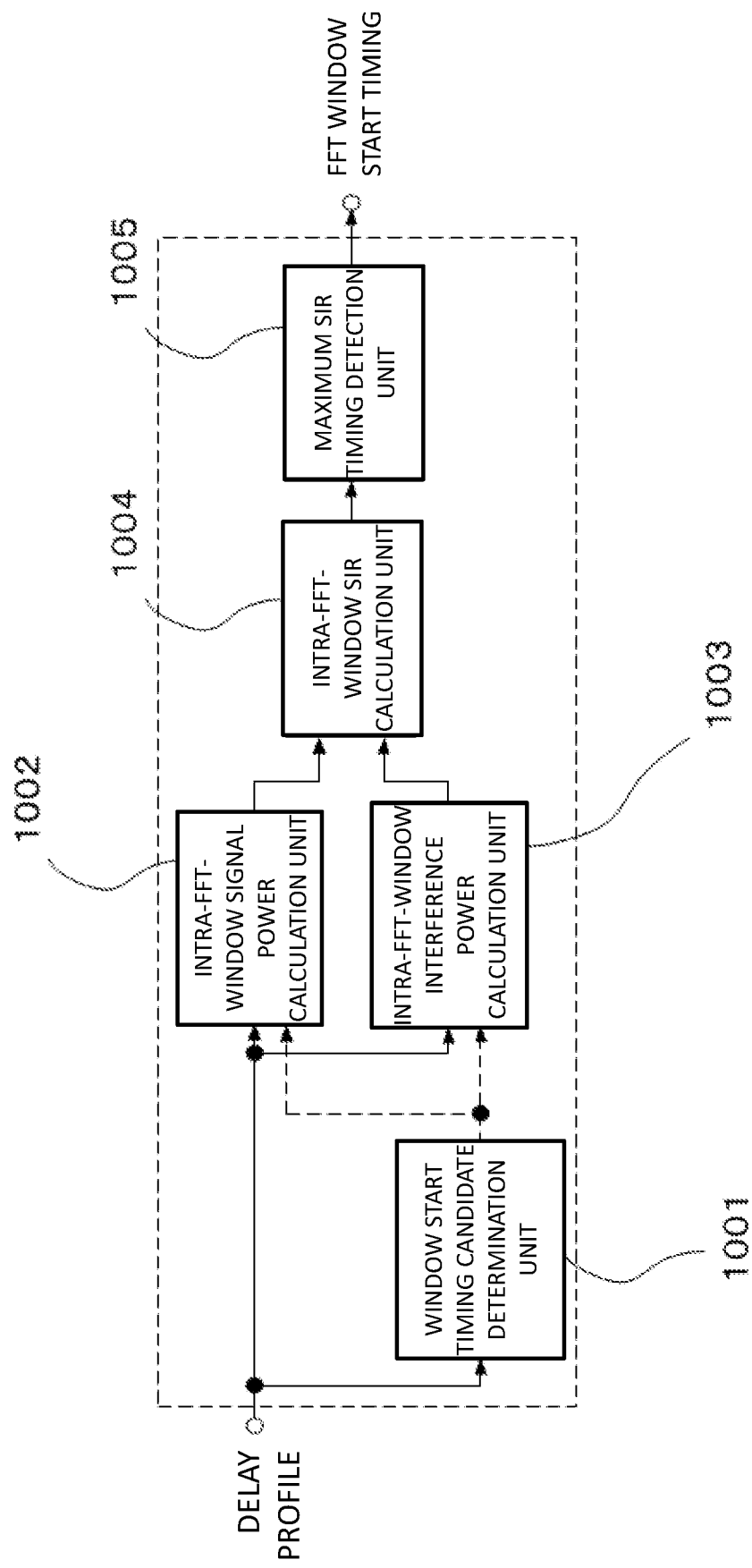
FIG. 12 is a block diagram illustrating a simplified configuration example of a Fourier transform window timing determination unit disclosed in PTL 1.
Figure 13:
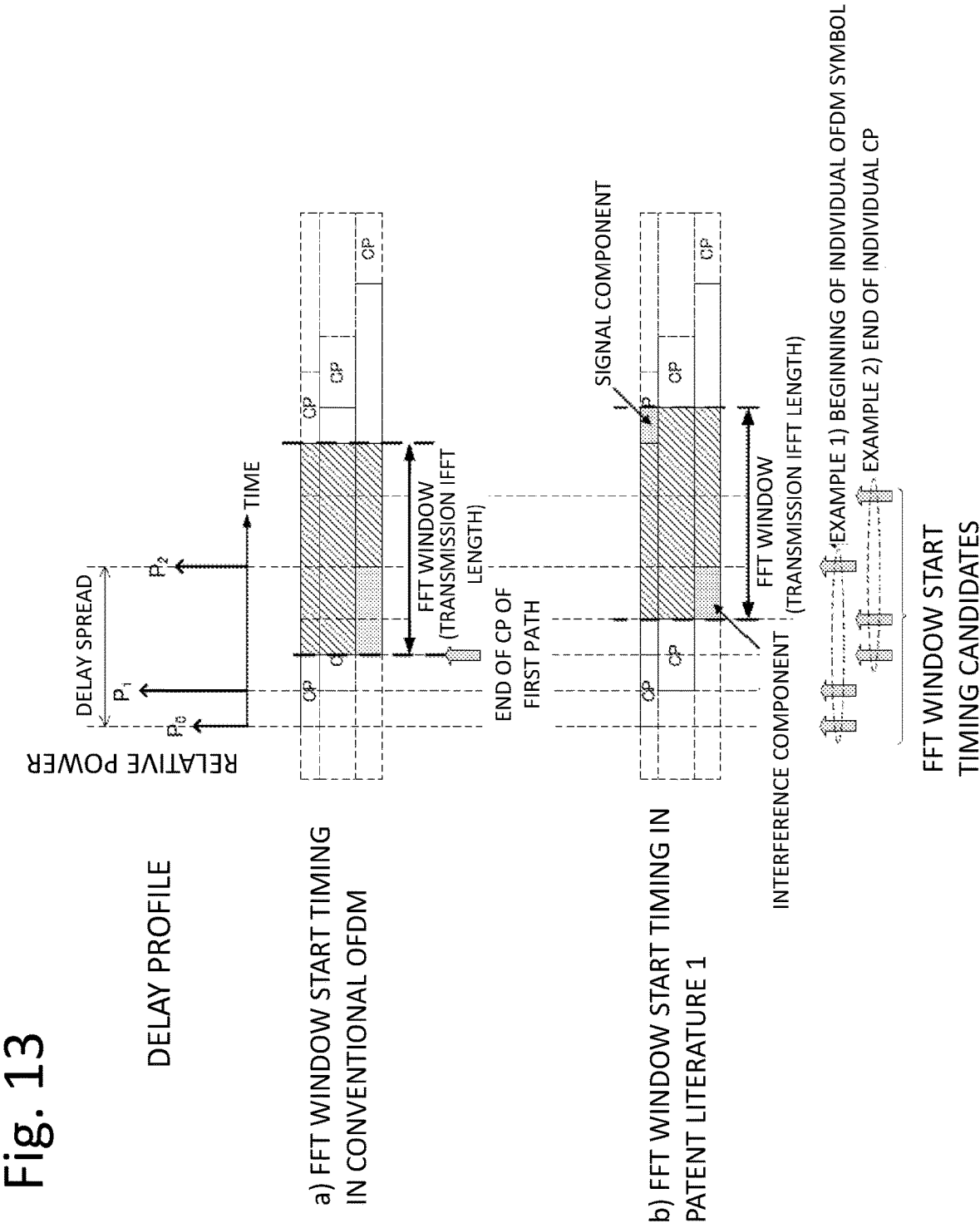
FIG. 13 schematically illustrates FFT window start timing candidates in a conventional OFDM and PTL 1.
Figure 14:
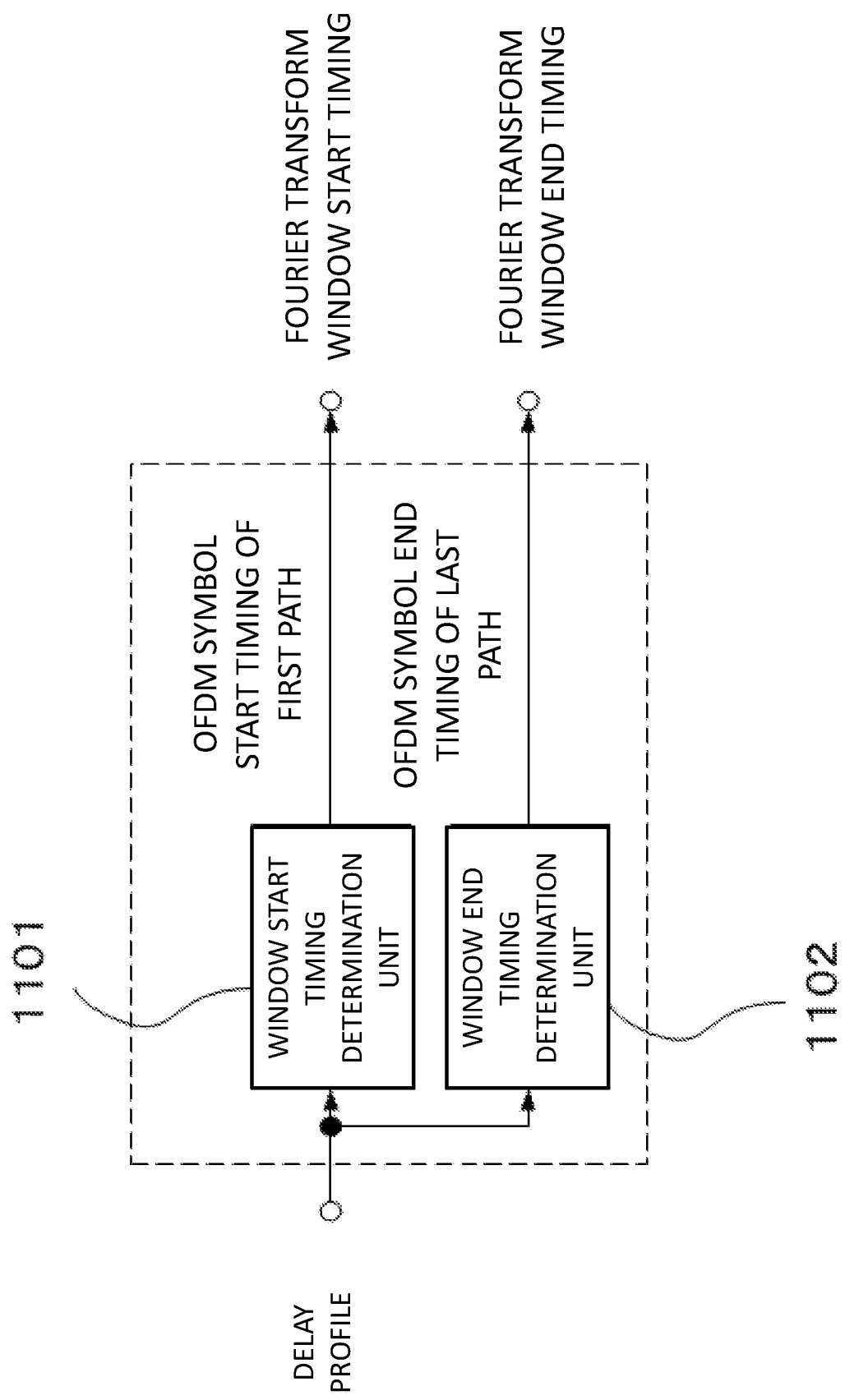
FIG. 14 is a block diagram illustrating a simplified configuration example of a Fourier transform window timing determination unit disclosed in NPL 1.
Figure 15:
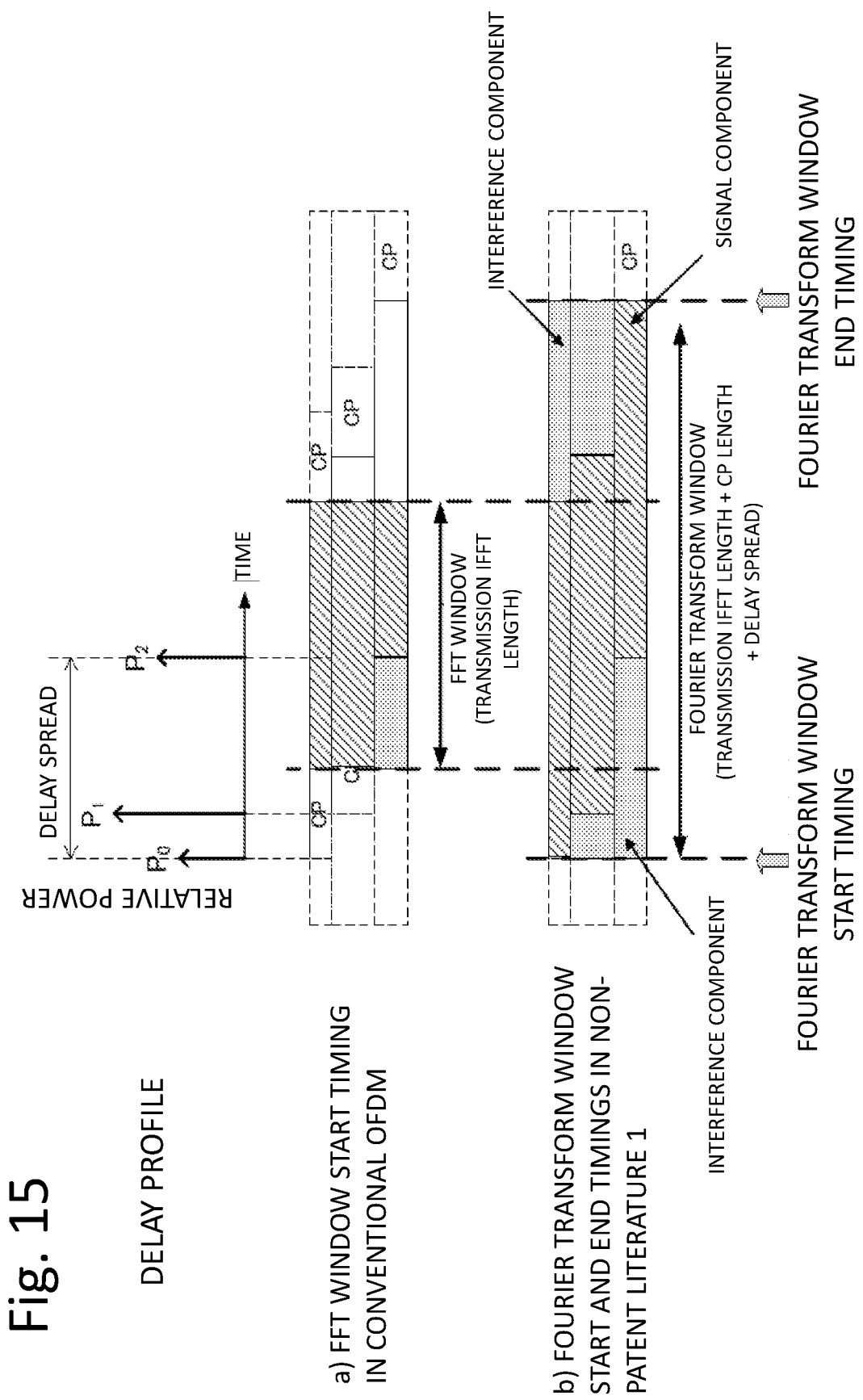
FIG. 15 schematically illustrates an FFT window start timing in the conventional OFDM and Fourier transform window start and end timings disclosed in NPL 1.

FIG. 11 illustrates an example of a table for determining the offset a relative to the MCS index. Assuming that $\alpha_0$, $\alpha_1$, $\alpha_2$, and $\alpha_n$ are offset setting values in the determination table, when the window timings are selected based on the maximum signal power under the SIR constraint, values satisfying $\alpha_0 < \alpha_1 < \alpha_2 < \alpha_n$ are set. In this way, when a packet having a smaller MCS index is received, a smaller value is set as the adaptive threshold $\gamma_{adapt}$. Thus, the SIR constraint in the window timing determination is eased. On the other hand, when a packet having a larger MCS index is received, a larger value is set as the adaptive threshold $\gamma_{adapt}$. Thus, the SIR constraint in the window timing determination is tightened.

In contrast, when the window timings are selected based on the maximum SIR under the signal power constraint, values satisfying $\alpha_0 > \alpha_1 > \alpha_2 > \alpha_n$ are set. In this way, when a packet having a smaller MSC index is received, a larger value among possible values is set as the adaptive threshold $\gamma_{adapt}$. Thus, the signal power constraint in the window timing determination is tightened. In addition, when a packet having a larger MSC index is received, a smaller value among possible values is set as the adaptive threshold $\gamma_{adapt}$. Thus, the signal power constraint in the window timing determination is eased.

As described above, according to the third example embodiment, when the window timings are selected based on the maximum signal power under the SIR constraint, if a packet having a lower MCS index is received, the SIR constraint is eased so that the recovery of the signal power is prioritized. If a packet having a higher MCS index is received, the SIR constraint is tightened so that the suppression of the residual interference is prioritized. As a result, the reception characteristics can be improved. On the other hand, when the window timings are selected based on the maximum SIR under the signal power constraint, if a packet having a lower MCS index is received, the signal power constraint is tightened so that the recovery of the signal power is prioritized. If a packet having a higher MCS index is received, the signal power constraint is eased so that the suppression of the residual interference is prioritized. As a result, the reception characteristics can be improved.

The above second and third example embodiments have been described by using examples in which the adaptive threshold is changed depending on the received SINR or MSC index. However, as another example, the adaptive threshold may be changed by using the number of operations repeated by the interference canceller.

While an individual example embodiment of the present invention has thus been described, the present invention is not limited thereto. Further variations, substitutions, or adjustments can be made without departing from the basic technical concept of the present invention. For example, the configurations of the networks and elements and the representations of the messages illustrated in the drawings are used only as examples to facilitate understanding of the present invention. Namely, the present invention is not limited to the configurations illustrated in the drawings.

For example, while the above example embodiments have been described by using the examples in which OFDM is used as the transmission technique, the present invention can be applied to other transmission techniques such as OFCDM (Orthogonal Frequency and Code Division Multiplexing).

Finally, suitable modes of the present invention will be summarized.

[Mode 1]
(See the receiving apparatus according to the above first aspect)

[Mode 2]
The receiving apparatus according to mode 1, wherein, from Fourier transform window start and end timings at which the signal power in the Fourier transform window is larger than a predetermined threshold, the window timing selection means selects a pair of timings achieving a maximum signal-to-interference power ratio.

[Mode 3]
The receiving apparatus according to mode 1, wherein, from Fourier transform window start and end timings at which the signal-to-interference power ratio in the Fourier transform window is larger than a predetermined threshold, the window timing selection means selects a pair of timings achieving a maximum signal power.

[Mode 4]
The receiving apparatus according to mode 2 or 3, wherein, as a condition for selecting the Fourier transform window start and end timing candidates, the window timing selection means selects Fourier transform window start and end timings at which a length of the Fourier transform window is equal to or more than an OFDM symbol length.

[Mode 5]
The receiving apparatus according to any one of modes 1 to 4, further comprising:
window end timing candidate determination means that refers to a delay profile(s) of the received signal(s) and determines an end of at least one desired symbol as the Fourier transform window end timing candidate(s), and
wherein the window timing selection means selects a window end timing from the at least one window end timing candidate outputted by the window end timing candidate determination means.

[Mode 6]
The receiving apparatus according to any one of modes 2 to 5, further comprising:
reception quality estimation means that estimates a signal-to-interference-plus-noise-power-ratio of the received signal(s); and
adaptive threshold determination means that changes the threshold based on the signal-to-interference-plus-noise-power-ratio outputted by the reception quality estimation means.

[Mode 7]
The receiving apparatus according to any one of modes 2 to 5, further comprising adaptive threshold determination means that changes the threshold based on an MCS index(es) corresponding to the received signal(s).

[Mode 8]
(See the receiving method according to the above second aspect)

The above mode 8 can be expanded to modes 2 to 7 in the same way as mode 1 is expanded to modes 2 to 7.

The disclosure of each of the above PTLs and NPL is incorporated herein by reference thereto. Variations and adjustments of the example embodiments and examples are possible within the scope of the overall disclosure (including the claims) of the present invention and based on the basic technical concept of the present invention. Various combinations and selections of various disclosed elements (including the elements in each of the claims, example embodiments, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have specifically been disclosed.

INDUSTRIAL APPLICABILITY

The present invention is suitably applicable to receiving apparatuses and receiving methods used with OFDM-based transmission techniques.

What is claimed is:

1. A receiving apparatus, comprising:
a processor;
a memory storing program code executable by the processor to:
determine Fourier transform window start and end timings for a received signal(s) based on OFDM, based on a signal-to-interference power ratio and signal power in a Fourier transform window;
perform Fourier transform on the received signal(s) in accordance with the Fourier transform window start and end timings;
determine a threshold according to a signal power S (0, L−1) of the Fourier transform window start and end timings to cover a plurality of OFDM symbols that have passed through a multipath channel; and
from Fourier transform window start and end timings at which the signal power in the Fourier transform window is larger than the threshold, select a pair of timings achieving a maximum signal-to-interference power ratio,
wherein S is signal power, L is a number of paths of a communication channel and is an integer of one or more.

2. The receiving apparatus according to claim 1, wherein, as a condition for selecting the Fourier transform window start and end timing candidates, processor selects Fourier transform window start and end timings at which a length of the Fourier transform window is equal to or more than an OFDM symbol length.

3. The receiving apparatus according to claim 1, wherein the program code is executable by the processor to further:
refer to a delay profile(s) of the received signal(s);
determine an end of at least one desired symbol as the Fourier transform window end timing candidate(s); and
select a window end timing from the at least one window end timing candidate.

4. The receiving apparatus according to any claim 1, wherein the program code is executable by the processor to further:
estimate a signal-to-interference-plus-noise-power-ratio of the received signal(s); and
change the threshold based on the signal-to-interference-plus-noise-power-ratio outputted by the reception quality estimation unit.

5. The receiving apparatus according to claim 1, wherein the program code is executable by the processor to further:
change the threshold based on an MCS index(es) corresponding to the received signal(s).

6. The receiving apparatus according to claim 1, wherein the program code is executable by the processor to further:
refer to a delay profile(s) of the received signal(s) and determines an end of at least one desired symbol as the Fourier transform window end timing candidate(s); and
select a window end timing from the at least one window end timing candidate.

7. The receiving apparatus according to claim 2, wherein the program code is executable by the processor to further:
refer to a delay profile(s) of the received signal(s) and determines an end of at least one desired symbol as the Fourier transform window end timing candidate(s); and
select a window end timing from the at least one window end timing candidate.

8. The receiving apparatus according to claim 2, wherein the program code is executable by the processor to further:
estimate a signal-to-interference-plus-noise-power-ratio of the received signal(s); and
change the threshold based on the signal-to-interference-plus-noise-power-ratio.

9. The receiving apparatus according to claim 3, wherein the program code is executable by the processor to further:
estimate a signal-to-interference-plus-noise-power-ratio of the received signal(s); and
change the threshold based on the signal-to-interference-plus-noise-power-ratio.

10. The receiving apparatus according to claim 2, wherein the program code is executable by the processor to further:
change the threshold based on an MCS index(es) of the received signal(s).

11. The receiving apparatus according to claim 3, wherein the program code is executable by the processor to further:
change the threshold based on an MCS index(es) of the received signal(s).

12. A receiving apparatus, comprising:
a processor;
a memory storing program code executable by the processor to:
determine Fourier transform window start and end timings for a received signal(s) based on OFDM, based on a signal-to-interference power ratio and signal power in a Fourier transform window;
perform Fourier transform on the received signal(s) in accordance with the Fourier transform window start and end timings;
determine a threshold according to a signal power S (0, L−1) of the Fourier transform window start and end timings to cover a plurality of OFDM symbols that have passed through a multipath channel; and
from Fourier transform window start and end timings at which the signal-to-interference power ratio in the Fourier transform window is larger than the threshold, select a pair of timings achieving a maximum signal power,
wherein S is signal power, L is a number of paths of a communication channel and is an integer of one or more.

13. The receiving apparatus according to claim 12, wherein, as a condition for selecting the Fourier transform window start and end timing candidates, the processor selects Fourier transform window start and end timings at which a length of the Fourier transform window is equal to or more than an OFDM symbol length.

14. The receiving apparatus according to claim 12, wherein the program code is executable by the processor to further:
refer to a delay profile(s) of the received signal(s) and determines an end of at least one desired symbol as the Fourier transform window end timing candidate(s); and
select a window end timing from the at least one window end timing candidate.

15. The receiving apparatus according to claim 12, wherein the program code is executable by the processor to further:
estimate a signal-to-interference-plus-noise-power-ratio of the received signal(s); and
change the threshold based on the signal-to-interference-plus-noise-power-ratio.

16. The receiving apparatus according to claim 12, wherein the program code is executable by the processor to further:
change the threshold based on an MCS index(es) of the received signal(s).

17. A receiving method, comprising:
determining Fourier transform window start and end timings for a received signal(s) based on OFDM, based on a signal-to-interference power ratio and signal power in a Fourier transform window;
performing Fourier transform on the received signal(s) in accordance with the Fourier transform window start and end timings; and
determining a threshold according to a signal power S (0, L−1) of the Fourier transform window start and end timings to cover a plurality of OFDM symbols that have passed through a multipath channel,
wherein, a pair of timings achieving a maximum signal-to-interference power ratio is selected from Fourier transform window start and end timings at which the signal power in the Fourier transform window is larger than the threshold,
wherein S is signal power, L is a number of paths of a communication channel and is an integer of one or more.

* * * * *